Figure 1:
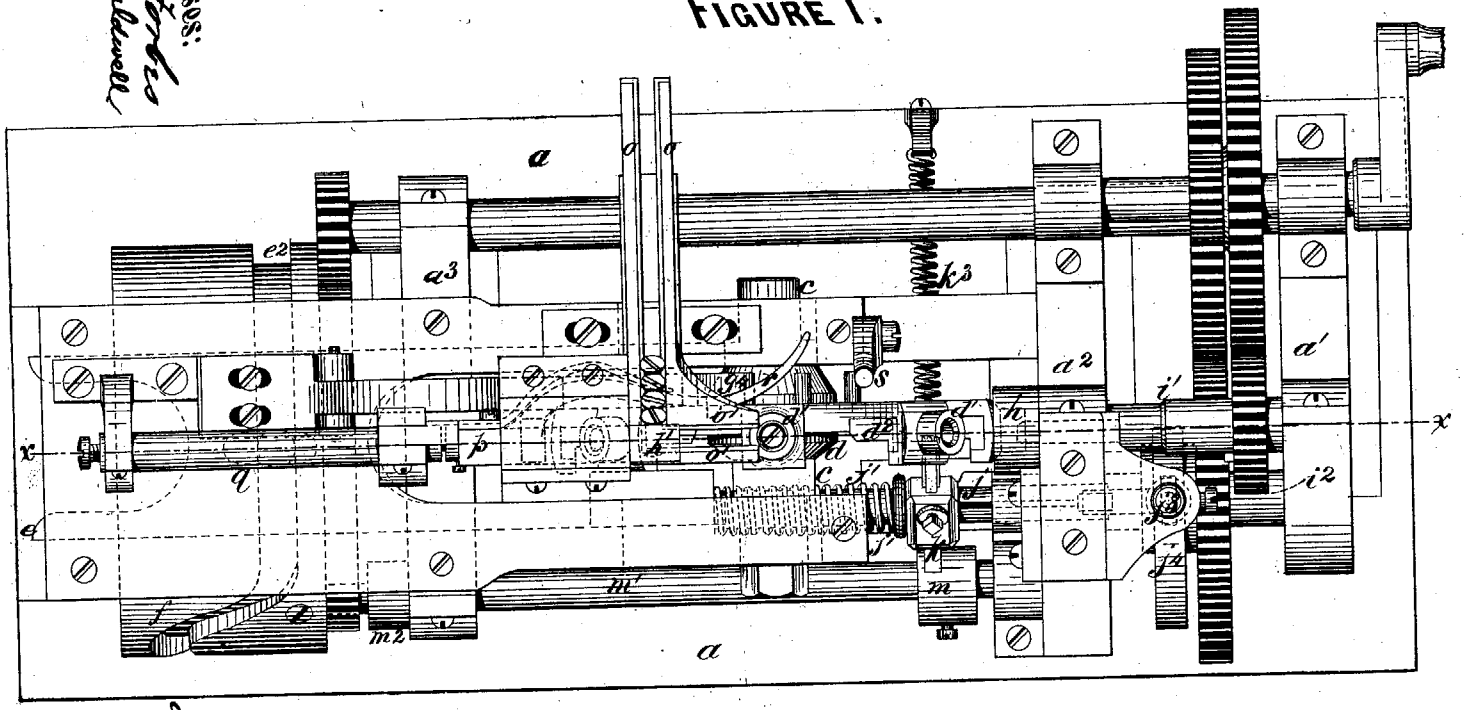

7 Sheets—Sheet 1.

H. A. HARVEY.

Assignor by mesne assignments to the American Screw Company.

MACHINE FOR THREADING WOOD SCREWS.

No. 7,573. Reissued March 27, 1877.

Witnesses:
C. W. Forbes
A. B. Cauldwell

Assignee:
American Screw Co
By [illegible]
Atty

THE NORRIS PETERS CO., PHOTO-LITHO., WASHINGTON, D. C.

H. A. HARVEY.

Assignor by mesne assignments to the American Screw Company.

MACHINE FOR THREADING WOOD SCREWS.

No. 7,573. Reissued March 27, 1877.

Assignee:
American Screw Co.
By Wm. C. Wood
Atty.

Witnesses:
C. M. Forbes
A. B. Cauldwell

THE NORRIS PETERS CO., PHOTO-LITHO., WASHINGTON, D. C.

H. A. HARVEY.

Assignor by mesne assignments to the American Screw Company.

MACHINE FOR THREADING WOOD SCREWS.

No. 7,573. Reissued March 27, 1877.

Assignee:
American Screw Co.
By Mm G. Mead
Atty.

Witnesses:
J. M. Forbes
A. Bleauldwell

THE NORRIS PETERS CO., PHOTO-LITHO., WASHINGTON, D. C.

H. A. HARVEY.

Assignor by mesne assignments to the American Screw Company.

MACHINE FOR THREADING WOOD SCREWS.

No. 7,573. Reissued March 27, 1877.

Assignee:
American Screw Co.
By Wm. B. Wood
Atty.

Witnesses:
G. H. Forbes
A. B. Cauldwell.

THE NORRIS PETERS CO., PHOTO-LITHO., WASHINGTON, D. C.

H. A. HARVEY.

Assignor by mesne assignments to the American Screw Company.

MACHINE FOR THREADING WOOD SCREWS.

No. 7,573. Reissued March 27, 1877.

Witnesses:
C. M. Forbes
A. B. Cauldwell

Assignee:
American Screw Co.
By Munn & Co.
Attys.

THE NORRIS PETERS CO., PHOTO-LITHO., WASHINGTON, D. C.

H. A. HARVEY.

Assignor by mesne assignments to the American Screw Company.

MACHINE FOR THREADING WOOD SCREWS.

No. 7,573. Reissued March 27, 1877.

Witnesses:
C. H. Forbes
A. B. Cauldwell:

Assignee:
American Screw Co.
by P. McNeill
Atty.

THE NORRIS PETERS CO., PHOTO-LITHO., WASHINGTON, D. C.

H. A. HARVEY.

Assignor by mesne assignments to the American Screw Company.

MACHINE FOR THREADING WOOD SCREWS.

No. 7,573. Reissued March 27, 1877.

Witnesses:
P. McForbes
A. B. Cauldwell

Assignee:
American Screw Co.
By W. McMood
Atty

THE NORRIS PETERS CO., PHOTO-LITHO., WASHINGTON, D. C.

UNITED STATES PATENT OFFICE.

AMERICAN SCREW COMPANY, OF PROVIDENCE, RHODE ISLAND, ASSIGNEE, BY MESNE ASSIGNMENTS, OF HAYWARD A. HARVEY.

IMPROVEMENT IN MACHINES FOR THREADING WOOD-SCREWS.

Specification forming part of Letters Patent No. 42,766, dated May 17, 1864; antedated April 26, 1864; reissue No. 7,573, dated March 27, 1877; application filed March 7, 1877.

*To all whom it may concern:*

Be it known that HAYWARD A. HARVEY, of the city, county, and State of New York, did invent certain Improvements in Machinery for Manufacturing Wood and other Screws, of which the following is a specification:

These improvements relate to that class of screw machines wherein the blanks are automatically subjected to the action of the mechanism which cuts them by means of a carrying-wheel, consisting of a series of screw-blank receivers arranged upon a hub having an intermittent rotating motion, and a reciprocating motion in a right line.

This invention consists, primarily, in so organizing the carrying-wheel in relation to the devices with which it is combined that, by means of the compound motions of the carrying wheel, the screw-blanks deposited in the receivers are each in turn presented in a properly-centralized position to an external mandrel or screw driver, which engages the head of the blank.

This invention further consists in making a portion of each holder, in which the blanks are successively received and carried, a back-rest for the support of the shank of the blank while it is being subjected to the threading operation; and, finally, this invention includes devices for automatically supplying blanks, one by one, to the receivers in the carrying-wheel, and for controlling the operation of a chasing-tool for cutting the threads on the blanks.

In this machine, which is organized with reference to operating upon blanks that have already been nicked and shaved, the carrying-wheel acts in combination with a revolving screw-driver and a chasing-tool, which has the proper motions to enable it to cut the thread upon a revolving blank.

Figure 2:
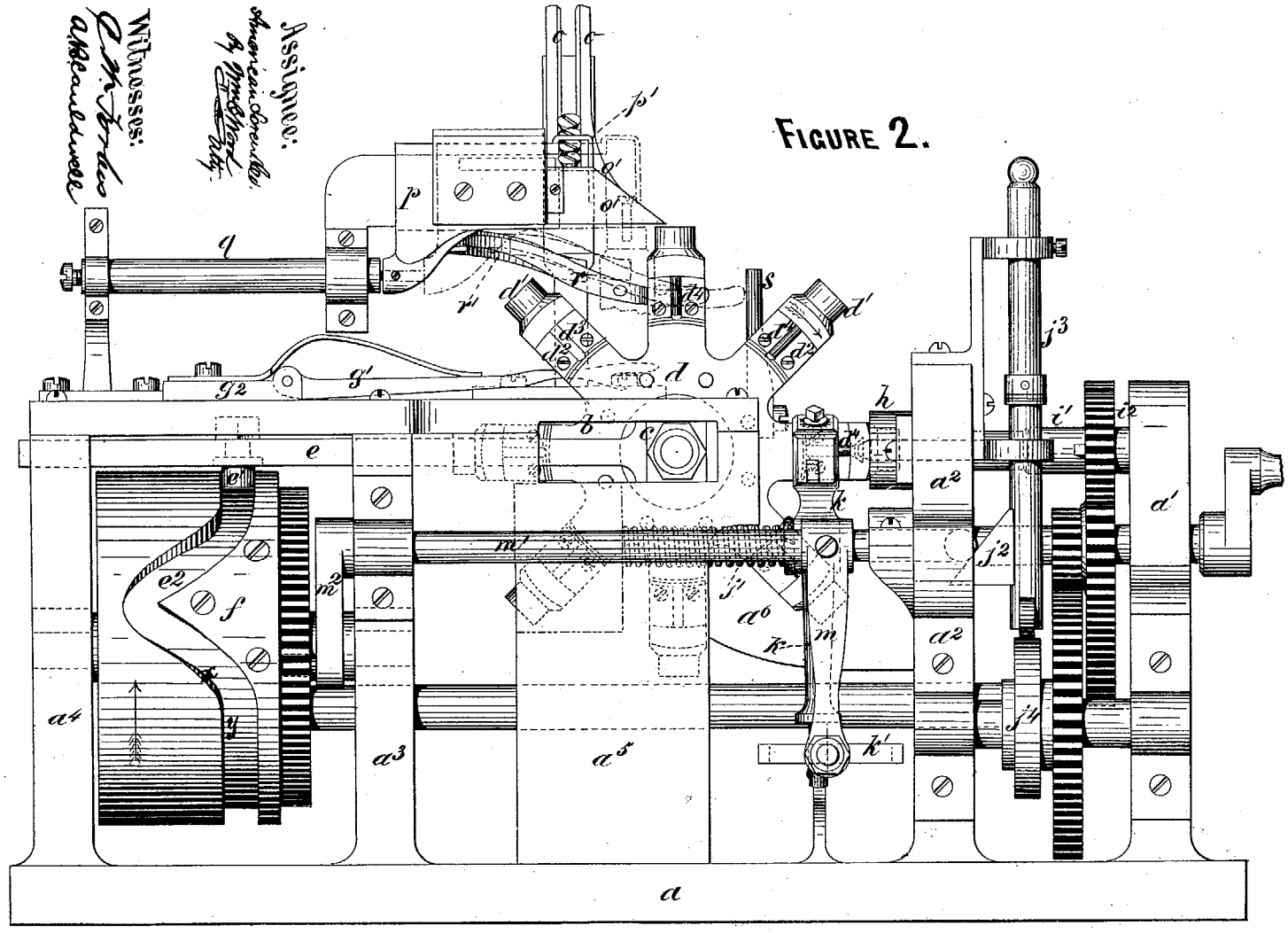
Figure 3:
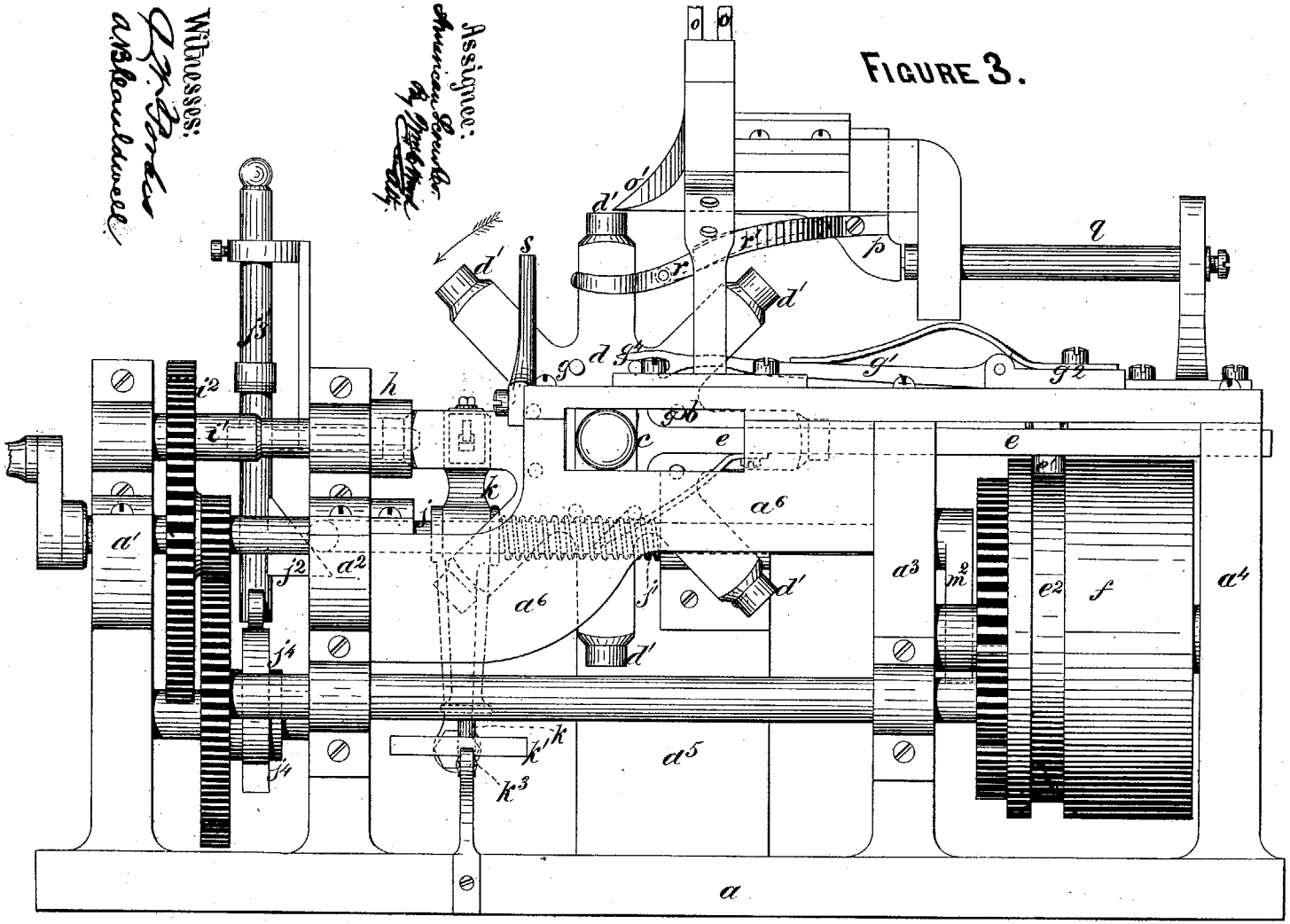
Figure 4:
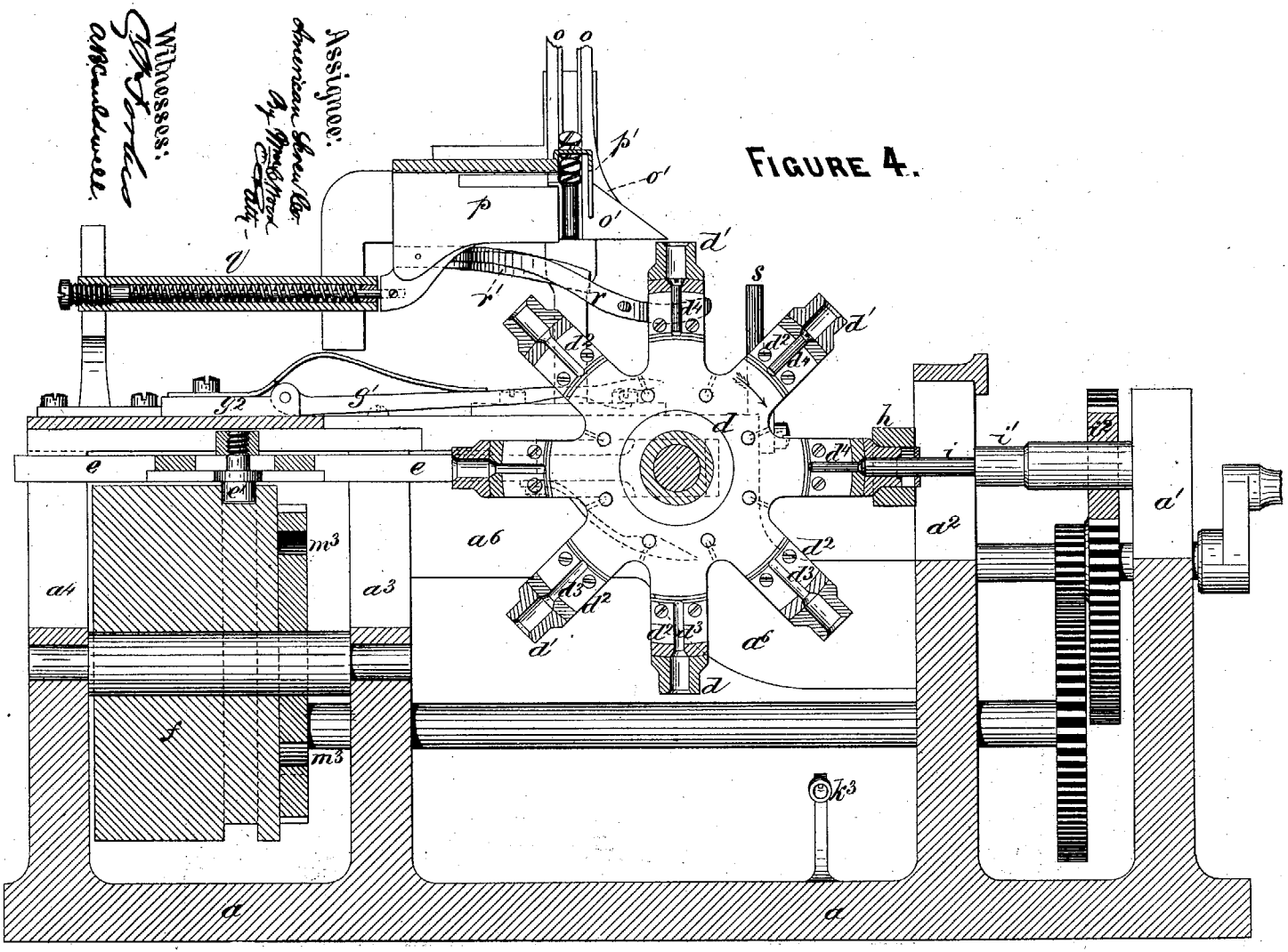
Figure 6:
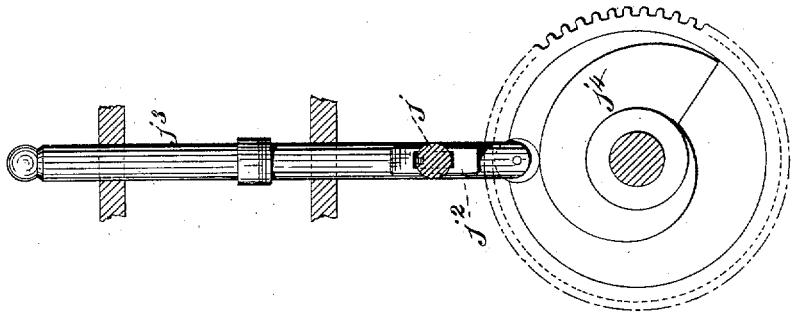
Figure 5:
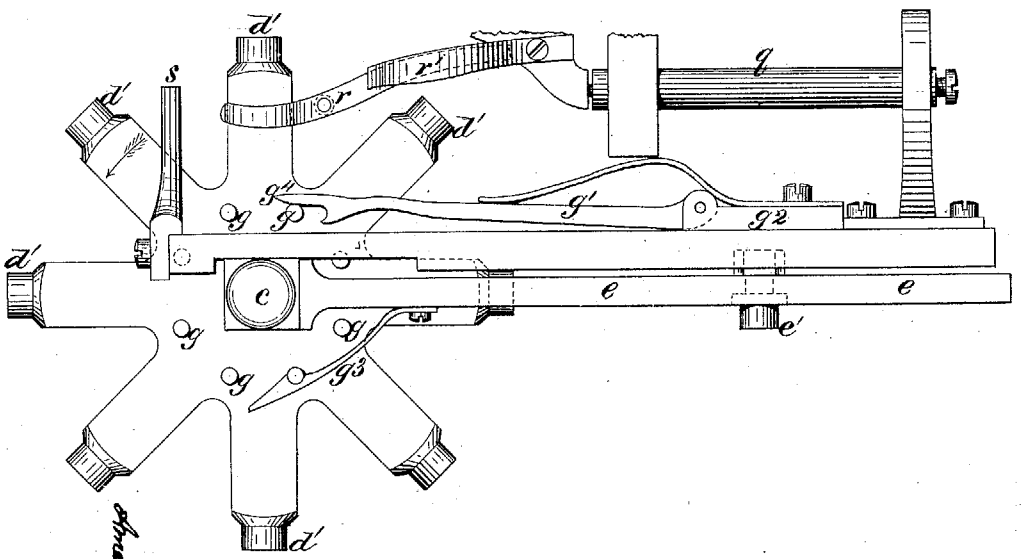
Figure 8:
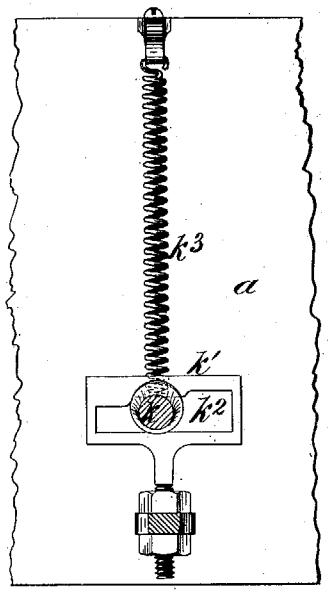
Figure 7:
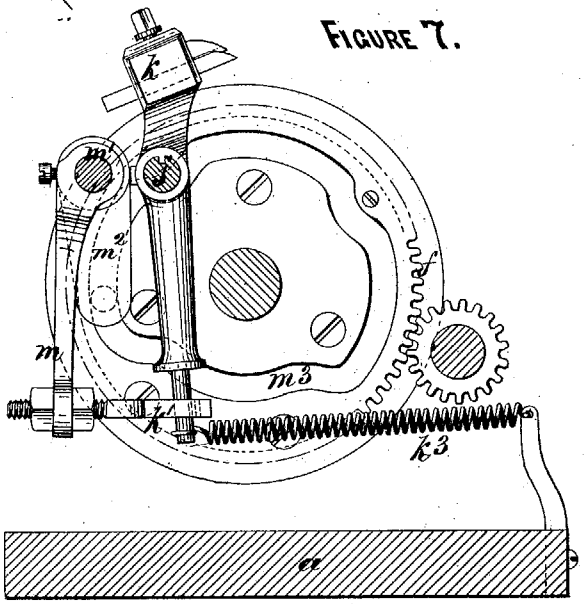
Figure 9:
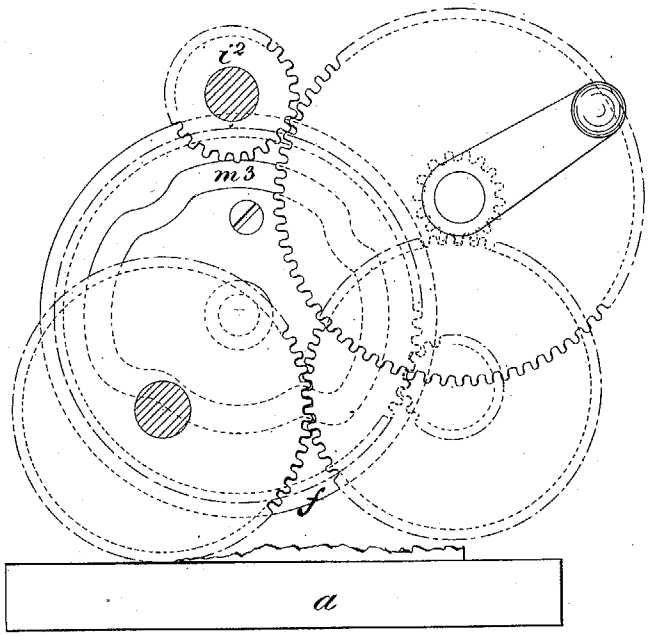

The accompanying drawings are as follows:

Figure 1 is a plan or top view of the whole contrivance. Fig. 2 is a front elevation thereof; Fig. 3, a rear elevation thereof; Fig. 4, a vertical section through the same on the line *x x* of Fig. 1. Fig. 5 is a rear elevation in detail of certain parts. Fig. 6 is an end elevation of the inclined plane that gives the pitch to the thread, and its actuating cam and cog. Fig. 7 is an end elevation of the mechanism that gives to the tool-holder its motion toward and from the blank. Fig. 8 is a plan of the mold or pattern which causes the cutter to give form to the screw, and Fig. 9 is an end elevation explanatory of the gearing giving motion to the various parts of the machine.

The machine has a substantial frame, consisting of the bed-plate *a*, the transverse uprights $a^1$ $a^2$ $a^3$ $a^4$, the longitudinal upright $a^5$, and the bridge $a^6$, connecting the transverse uprights $a^2$ and $a^3$.

In the side of the longitudinal upright $a^5$, and in the side of the bridge $a^6$, are formed guiding-slots *b b*, for the reception of the sliding boxes *c c*, which afford bearings for the shaft of the carrying-wheel *d d*.

The carrying-wheel is in the form of a star, having each of its points or arms terminating in a short cylinder, $d^1$ $d^1$.

These cylinders are hollow, and the openings in them are of just sufficient size to receive the shank of a screw-blank.

These openings may be slightly enlarged at the outer end, as shown in Fig. 4, for the purpose of facilitating the introduction of blanks into them. Between the cylinder and the center of the wheel pieces of steel $d^2$ $d^2$ are screwed fast to the arms of the star, and these pieces are, at the ends near the cylinder, so bored through as to fit accurately the under side of the head and a small part of the body of a screw-blank, and that part of the pieces $d^2$ farther toward the center of the wheel contains a cavity, $d^3$, Fig. 4, which incloses about one-half of the body of a blank, supposing it to be divided lengthwise. A screw-blank will therefore rest in one of the pieces $d^2$, with the under side of its head, and a part of its body nearest thereto, wholly inclosed, and the other part half exposed. (See $d^4$, Figs. 2 and 4.) The receiver consists of the cylindrical bore, large enough to admit the head, the conical bore, which receives and supports the under side of the head, the smaller cylindrical cavity, which just contains a portion of the barrel, and the semi-cylindrical, or nearly semi-cylindrical, cavity, which incloses one-half, or thereabout, of the rest of the barrel. A series of these receivers or holders must in this machine be so mounted that they will both revolve and slide; but the precise number of receivers, or the precise manner in which the receivers are formed, or the number of pieces of which they are constructed, or by what precise apparatus the series is caused to revolve and slide, is immaterial.

A forked slide, $e$, is attached to or made in one piece with the boxes $c$ $c$, and is guided by proper slots in the frame. From this slide depends a pin, $e^1$, which enters a cam-groove, $e^2$, in a revolving cam-wheel, $f$. Upon the star-wheel are a series of pins, $g$ $g$ $g$. An impelling-pawl, $g^1$, is hinged to a piece, $g^2$, which is attached to the frame by adjusting-screws. This pawl is pressed down by a spring, and prevented from falling too far by a projection, $g^4$, which always rests on one or other of the pins.

A spring holding-pawl, $g^3$, is bolted to the slide, and has at its end a cavity fitting and capable of receiving about one-half of one of the pins. The pawl $g^3$ acts as a stop for arresting the rotation of the carrying-wheel when the one of the receivers containing the blank which is to be operated upon has been brought axially into line with the screw-driver. A socket, $h$, bored out so as to receive with a close fit the outer ends of the receivers and carriers, is secured to the standard $a^2$, in such position as to inclose and rigidly support the end of one of the receivers when the carrying-wheel is advanced. A screw-driver stock, $i$, having on its end a screw-driver, lies within the socket, so supported that its axis is coincident with the axis of the socket. This stock is prevented from moving endwise by collars or shoulders on the shaft $i^1$, to which it is secured, and is kept in continuous revolution by means of a cog-wheel, $i^2$, secured upon the shaft that carries the stock.

The action of these parts is as follows, supposing the time of beginning to be when the parts are in the position shown in Figs. 1, 2, 3, 4, and blanks to be inserted in three of the receivers, as in Fig. 2: The screw-driver is then in the nick of one of the blanks, and is causing it to revolve rapidly. The star-wheel, with its receivers and carriers, is at rest, and the cam-wheel $f$ is revolving. When the cam $f$ revolves so far that the pin $e^1$ enters that part of the groove $e^2$ which leads away from the socket, then the groove commences to draw the slide, and consequently the star-wheel and the receiver, away from the socket. The star-wheel is thus slid backward until the receiver, previously within the socket, is fairly out of it. At or just after that time one of the pins $g$ on the carrying-wheel is brought in contact with the impelling-pawl, and the wheel, as it slides back, revolves until the next carrier in succession comes in line with the socket. At that time the holding-pawl $g^3$, by means of its spring, is caused to embrace one of the pins and hold the star-wheel in the position to which it has been revolved. The pin $e^1$ at this time is at the apex of the cam-groove. A further revolution of the cam causes the star-wheel to advance rapidly without revolution until the receiver, in line with the screw-driver, enters the socket to some distance. The advance is then made more slowly, and becomes slower and slower (see shape of cam from $x$ to $y$) until the carrier is pushed home into the socket, affording opportunity for the screw-driver to find and enter the nick in the head of the blank. By this slow motion of the carrier the screw-driver is enabled to enter the nick in a revolving blank with certainty, and without any danger of marring the head, and the fast motion of the carrier, up to the time that the head of the blank is about in contact with the end of the screw-driver, saves time in the working of the machine. As soon as the receiver is pushed home all motions of the star-wheel cease, the pin $e^1$ now being in that part of the cam-groove which is straight.

The blank commences to revolve as soon as its nick is fairly entered by the screw-driver.

A sliding shaft, $j$, so secured in the machine that its axis is parallel with that of the revolving blank, is forced in one direction by a spring, $j^1$, and in the other by an inclined plane, $j^2$, mounted upon a slide, $j^3$, the latter moved forward by a cam, $j^4$, and downward by its own weight, or by a spring.

Both the slide $j^3$ and the sliding shaft $j$ should be so held by guides or feathers, or similar contrivances, that they may slide endwise and cannot revolve, and rollers may be applied between their ends and the cam and inclined plane. The tool post or holder $k$ is mounted upon the shaft $j$ in such wise as to be free to oscillate thereon, but to be forced to follow the endwise motions of the shaft. This post carries at its upper end a threading or chasing tool of any usual or proper construction, and is prolonged downward until it enters a slot or cavity, $k^2$, (see specially Figs. 7 and 8,) in a transversely-reciprocating plate, $k$. One side of the cavity $k^2$ constitutes the mold or former, which governs the position of the cutting-tool. The lower end of the tool-post has attached to it a spiral spring, $k^3$, which always tends to rock the tool away from the screw-blank. The mold is secured to a rock-shaft arm, $m$, fastened upon a rock-shaft, $m^1$, which carries at its outer end another arm, $m^2$. This latter arm has upon it a pin that enters a cam-groove, $m^3$, on the end of the cam-wheel $f$.

This groove, when in revolution, oscillates the rock-shaft, and consequently the mold and tool-post and tool. The action of these parts is as follows, supposing the operation to commence at the time when a receiver is home in the socket and the blank is revolving: At that time the inclined plane is down, the sliding shaft is shoved endwise toward the socket, and the cam-pin attached to the arm $m^2$ is in such position as to permit the spring $k^3$ to hold the tool out of contact with the blank. As the inclined plane commences to rise it moves the shaft $j$ endwise, and at the same time the cam-groove $m^3$, acting through the agency of the mold, forces the chaser against the blank far enough to make the first cut, and there holds the chaser while, by the action of the inclined plane, it is so forced along the screw as to cut a thread of the required pitch. At the same time the depth of the cut is varied by any variable shape of the mold in which the lower end of the tool-post travels. As soon as one cut is finished the cam $m^3$ permits the spring $k^3$ to rock the tool away from the blank, and as soon as it is rocked away the cam $j^4$ permits the inclined plane to drop, and the spring $j^1$ moves the shaft $j$ endwise, thus keeping the chaser out of contact with the blank, and carrying it back to the commencing point. The cam $m^3$ then rocks the chaser in to its work again, enabling it to make a deeper cut, and the inclined plane, raised by its cam $j^4$, again gives the chaser the required lateral motion. When this cut is finished the tool again returns, as before, and thus as many successively deeper cuts are made as may be necessary.

The socket $h$ serves to steady the receiver inserted in it, and thus enables the receiver to afford a firm rest for the blank which is under the operation of the cutting-tool. When the last cut is made the chaser is rocked outward, and is again moved laterally by the movement of the inclined plane; but during this lateral movement the cam $m^3$ holds the chaser entirely out of contact with the blank, or rather with the finished screw. While the chaser is thus held out of contact with the screw, the star-wheel slides back, turns, and slides forward, thus removing the finished screw, and presenting a new blank to be revolved by the screw-driver and chased by the tool, which commences to act again when the new blank is revolving, and its receiver and carrier is fairly home in the socket. Those acquainted with the art of making screws by machinery will know how to lay out the cam to give as many cuts as necessary, and how much each cut should increase in depth, and also how to time the revolutions of this cam with those of the cam that moves the wedge or pitch-plane and with the screw-driver shaft. Revolution may be imparted to both cams and to the screw-driver by any proper train of gearing. The drawings indicate proper gearing for the purpose, and further description is deemed unnecessary.

During these operations the blanks are supposed to be put into the receivers by hand, and it is evident that the finished screws will drop out as the star-wheel revolves.

The offices of the carrying-wheel, provided with the series of screw-blank receivers, and having the compound motions described, are as follows: first, to present the receivers in convenient position for permitting the insertion of the blanks; secondly, to successively transfer the blanks contained in the receivers to a position axially coinciding with the screw-driver, so that the screw-driver will find and enter the nick in the screw-head when the carrying-wheel is at rest; thirdly, to hold the blank in position to be acted upon by the cutting-tool, and at the same time afford a back-rest for the blank during the operation of cutting the thread; fourthly, to remove the threaded screw from the place where it has been operated upon by the cutting mechanism, for the purpose of permitting the discharge of the threaded screw from the receiver, and for the purpose of permitting another receiver to present a blank in its turn to the operation of the cutting mechanism.

The office of the socket is to firmly hold the receivers successively, so that the blanks they contain may have a firm back-rest while they are being revolved and threaded. The pitch-plane gives the pitch or lead to the screw-thread, and the mold gives shape or contour to the screw. The cam $m^3$, acting through the mold, brings up the tool, holds it to its work, and permits it to be withdrawn at the proper time.

Blanks, instead of being put into the receivers by hand, may also be inserted by any of the feeders applicable to the purpose, and known to the manufacturers of wood-screws; but it is preferred to deliver the blanks to the receivers by a new apparatus, now to be described. This delivering apparatus consists of an ordinary inclined conductor, bent or curved near its end, in which slides a gate that permits the blanks to drop, or shoves them out one at a time from the end of a series of blanks, and holds back the remainder of the series until it becomes requisite to shove out the next blank in succession. The inclined ways or conductor is composed of two pieces with just space enough between them to receive the shank of a screw-blank, and support it by the head, and permit it to slide, as shown at $o\ o\ o'\ o'$. This conductor is preferably bent at right angles, and its two sides are so beveled at the top as to fit the lower side of the blank-heads. Just at the bend one of the sides is cut away, and a gate or slide, $p$, is so fitted as to play in the lower part of the ways. When this slide is retracted (see Fig. 4) the lower one of the series of screw-blanks, which may be fed into the conductor by hand or by machinery, rests against the bent part of the conductor. When the slide advances (see dotted lines, Fig. 2) it pushes out the blank which lies in front of it, and at the same time stops the further descent of the series of blanks.

The blank thus pushed out descends as it advances, owing to its head sliding down the inclined end $o'$ of the conductor, and finally drops off the end of the conductor.

In order to prevent the blow of the slide from throwing the blank out too fast when the machine is working at speed, there is attached to the slide a hook, $p'$, which prevents the blank from advancing faster than the hook moves.

In the drawings the slide is shown as mounted on a standard, and has attached to it a rod, which enters a case or socket, in which is contained a spring so contrived and attached that it always tends to draw the slide backward. To the slide is also attached a swinging rod, *r*, with a hook or latch upon it, and this rod is forced toward the star-wheel by a spring, *r'*. Upon the frame of the machine is mounted an unlatcher or disconnector, *s*. The operation of all these parts is as follows:

When the star-wheel moves back, one of its arms strikes the curved end of the swinging rod, and forces the latch away from the wheel. When the wheel has been moved backward and revolved one-eighth of a circle, one of the receivers is brought into vertical position directly under the end blank of the series in the conductor—that is, the blank that lies in front of the slide, and rests against the bent part of the conductor. The latch, being forced horizontally toward the wheel, catches against the front side of the arm which is immediately under the conductor. As the carrying-wheel is advanced it carries the latch (and consequently the slide and the blank in front of it) forward just as fast as the receiver under the blank advances, and the blank slides or is pushed gradually down the conductor into the receiver. (See dotted lines, Fig. 2.)

When the receiver has passed beyond the conductor, the curved part of the swinging rod strikes the vertical post or unlatcher *s*, and, being thus forced away from the wheel, frees the latch from the arm, and the spring in the case *q* then draws the slide back, permitting the series of blanks to slide down, as before, until the end blank of the series rests against the bent end of the conductor.

All parts of the delivering mechanism remain in this position until another blank is needed.

It will be seen that by the operation of these parts the blanks hang by their heads, points down, and that the receiver co-operates with the slide and conductor in effecting the successive delivery of the blanks with great certainty.

It will also be seen that if a conical tube with the large end up were fitted below the lower and bent part of the conductor, the delivering apparatus would then be capable of delivering blanks into a receiver which did not move with the blank.

It will be seen, further, that the upper end of the ways might be horizontal, provided the series of blanks were fed along by a pusher actuated at intervals by the machine. It is also clear that the lower end of the conductor might be curved, provided the slide be correspondingly curved, and it is intended at times to make the bend in the conductor at other angles than a right angle, and to deliver each blank to the receiver at the time when the rotation of the star-wheel is taking place.

It is not intended that the claim to a delivering apparatus, in combination with a receiver that moves as the slide moves, shall be limited to a receiver having all the characteristics of the receiver herein described, but that the combination shall include any receiver capable of holding and transferring a screw-blank.

What is claimed as this invention, and desired to be secured by Letters Patent, is—

1. A screw-driver for engaging the nick in a screw-head, in combination with a carrying-wheel provided with a series of screw-blank receivers, and having an intermittent rotating motion and a reciprocating sliding motion, substantially as described.

2. One or more screw-blank receivers, arranged upon a wheel or hub having the compound motions described, in combination with the stationary supporting-socket *h* and mechanism for cutting the thread upon the blank.

3. A chasing tool having the motions described, in combination with a back-rest for the shank of a screw, and a device for revolving the blank, when such rest forms a part of a receiver and carrier arranged upon a wheel having the compound motions described.

4. A revolving screw-driver, in combination with a receiver and carrier, or a series thereof, moved toward the screw-driver by a differential or fast and slow motion, substantially in the manner and for the purpose specified.

5. A delivering apparatus consisting of a bent or curved inclined conductor, and a slide operating in the lower or bent end thereof, the whole having a mode of operation substantially as described.

6. In combination with a delivering apparatus, substantially such as described, a receiver and carrier which moves as the slide of the delivery apparatus moves, so that the blank may be delivered and received under a mode of operation substantially as set forth.

AMERICAN SCREW CO.,
By EDWIN G. ANGELL, *Prest.*

Witnesses:
GEORGE FULLER,
J. C. B. WOODS.